(12) United States Patent
Shwartz

(10) Patent No.: US 8,602,148 B2
(45) Date of Patent: Dec. 10, 2013

(54) PORTABLE REMOVABLE APPARATUS FOR POWERING A BICYCLE

(76) Inventor: Shaul Shwartz, Even-Yehuda (IL)

(*) Notice: Subject to any disclaimer, the term of this patent is extended or adjusted under 35 U.S.C. 154(b) by 20 days.

(21) Appl. No.: 13/145,481

(22) PCT Filed: Jan. 28, 2009

(86) PCT No.: PCT/IL2009/000110
§ 371 (c)(1),
(2), (4) Date: Jul. 20, 2011

(87) PCT Pub. No.: WO2009/095914
PCT Pub. Date: Aug. 6, 2009

(65) Prior Publication Data
US 2011/0284303 A1 Nov. 24, 2011

(51) Int. Cl.
*B62K 11/00* (2013.01)

(52) U.S. Cl.
USPC .................. 180/205.1; 180/206.1; 180/206.7; 180/206.8

(58) Field of Classification Search
USPC ....................... 180/205.1, 206.1, 206.7, 206.8
See application file for complete search history.

(56) References Cited

U.S. PATENT DOCUMENTS

| | | | | |
|---|---|---|---|---|
| 2,457,430 A | * | 12/1948 | Argyris ...................... | 180/206.7 |
| 4,085,814 A | * | 4/1978 | Davidson et al. .......... | 180/206.7 |
| 4,122,907 A | * | 10/1978 | Davidson et al. .......... | 180/206.3 |
| 4,168,758 A | * | 9/1979 | Holt ............................ | 180/206.7 |
| 5,024,286 A | * | 6/1991 | Lean et al. .................. | 180/206.3 |
| 5,934,401 A | | 8/1999 | Mayer et al. | |
| 6,011,366 A | | 1/2000 | Murakami et al. | |
| 6,336,516 B1 | * | 1/2002 | McNelly .................... | 180/206.7 |
| 6,497,299 B1 | | 12/2002 | Sinclair et al. | |
| 6,571,899 B2 | * | 6/2003 | Simons ...................... | 180/206.5 |
| 6,591,929 B1 | * | 7/2003 | Tsuboi et al. .............. | 180/206.4 |
| 7,185,726 B2 | | 3/2007 | Young | |

(Continued)

FOREIGN PATENT DOCUMENTS

JP 09-058566 3/1997
JP 2006-347545 12/2006

(Continued)

OTHER PUBLICATIONS

International Search Report for PCT Application No. PCT/IL2009/000110 mailed on May 11, 2009.

(Continued)

*Primary Examiner* — Kevin Hurley
*Assistant Examiner* — Michael Stabley
(74) *Attorney, Agent, or Firm* — Pearl Cohen Zedek Latzer Baratz, LLP

(57) ABSTRACT

A portable removable apparatus for powering a bicycle driven by a chain is disclosed. The apparatus includes a portable and removable drive unit for propelling the bicycle. The drive unit includes an electric motor and a shaft rotatable by the motor, with a sprocket coaxially affixed to the shaft and adapted to engage to a portion of the chain. The apparatus also includes a bracket adapted to be fixed to a frame of the bicycle and to be in bearing contact with the shaft for supporting the shaft. The apparatus further includes at least one additional support for supporting the drive unit on the bicycle frame so that lateral torque on the drive unit when engaged with the chain and operating is substantially eliminated. Another embodiment is disclosed in which the drive unit includes a flexible belt looped around a drive pulley connected to the motor and an idler pulley.

13 Claims, 19 Drawing Sheets

(56) References Cited

U.S. PATENT DOCUMENTS

| | | | |
|---|---|---|---|
| 2004/0231905 A1* | 11/2004 | Kurita et al. | 180/205 |
| 2005/0087379 A1 | 4/2005 | Holland | |
| 2005/0189157 A1* | 9/2005 | Hays et al. | 180/207 |
| 2007/0222170 A1 | 9/2007 | Sasnowski | |

FOREIGN PATENT DOCUMENTS

| | | |
|---|---|---|
| WO | WO 95/15276 | 6/1995 |
| WO | WO 2005/009831 A2 | 2/2005 |
| WO | WO 2006/090213 A2 | 8/2006 |

OTHER PUBLICATIONS

Supplementary European Search Report for Application No. 09706482.8, mailed on May 6, 2013.

Office Action for Japanese Application No. 2011-547049, mailed on Aug. 27, 2013.

* cited by examiner

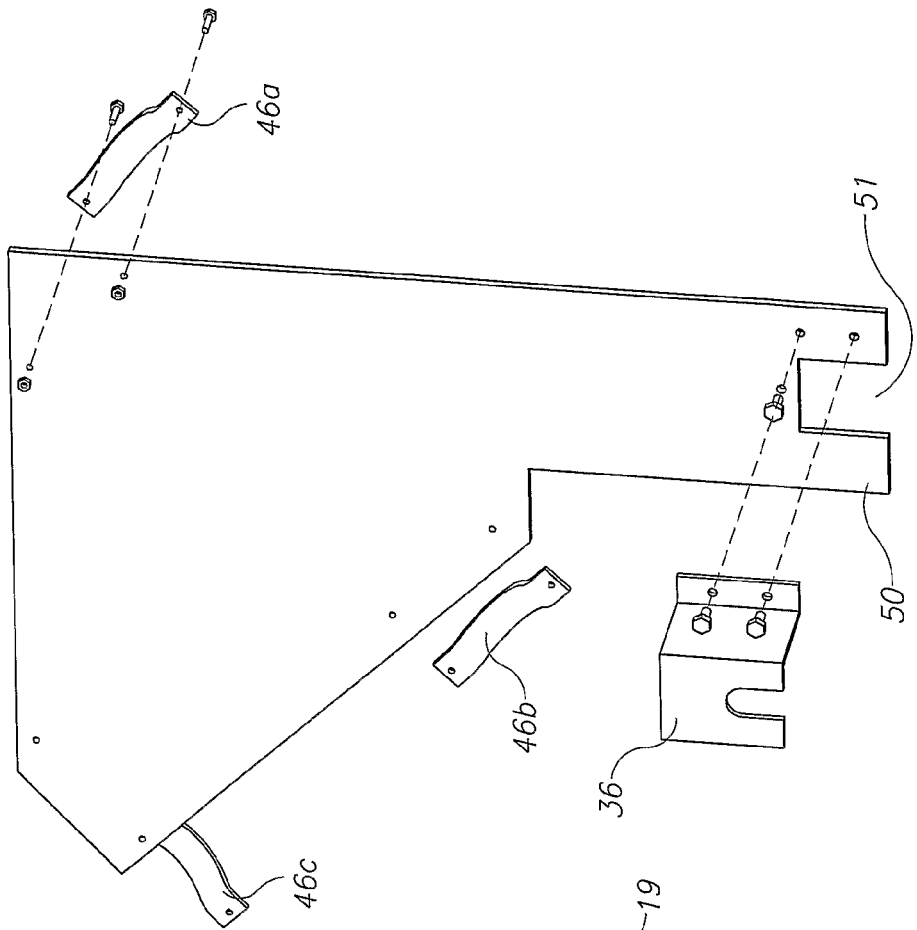
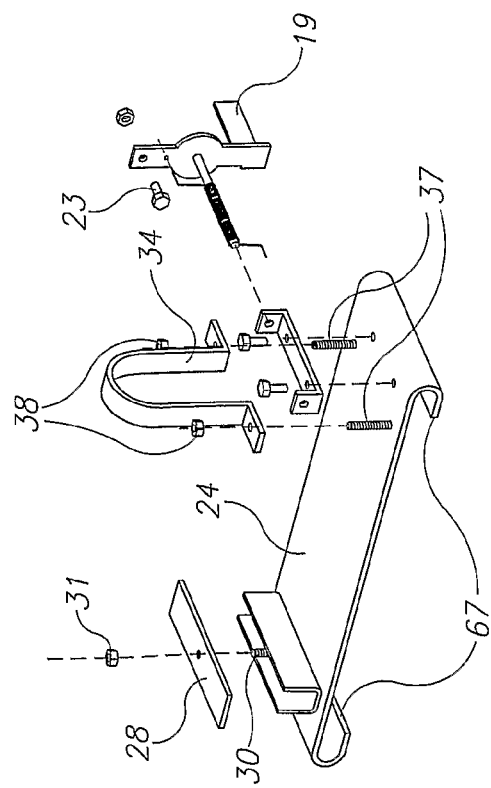
FIG.2C
FIG.2B

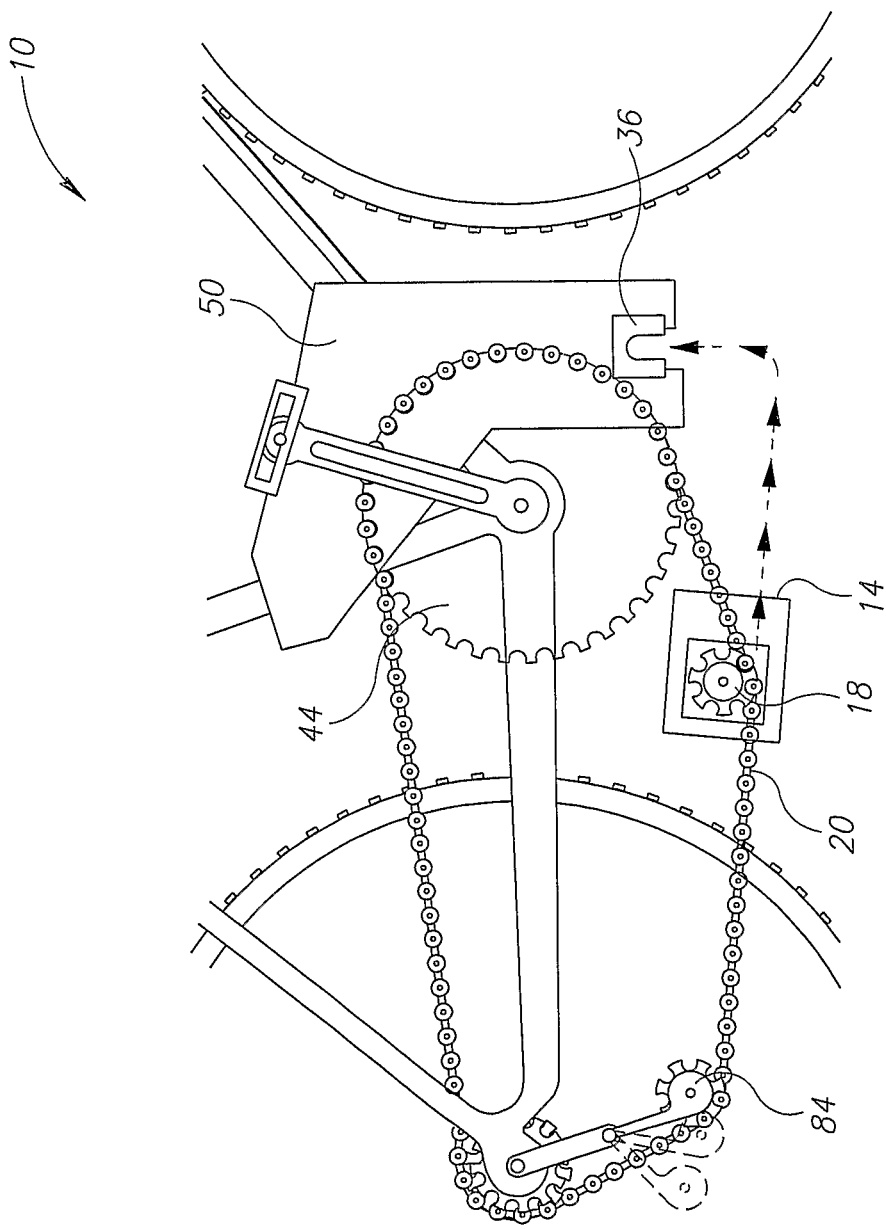

PORTABLE REMOVABLE APPARATUS FOR POWERING A BICYCLE

CROSS-REFERENCE TO RELATED APPLICATIONS

This application is a National Phase Application of PCT International Application No. PCT/IL2009/000110, International Filing Date Jan. 28, 2009, claiming no priority (the priority was withdrawn on Jul. 1, 2010).

FIELD OF THE INVENTION

The present invention relates to bicycles. More particularly, the present invention relates to a portable removable apparatus for powering a bicycle.

BACKGROUND OF THE INVENTION

The use of bicycles for the purpose of commuting has many advantages. Compared to automobiles and other forms of motorized transport, a bicycle is relatively inexpensive to purchase and maintain. A bicycle does not emit pollutants and does not occupy a large area when parked. Bicycles and bicycle lanes occupy relatively less space than typical motor vehicles and traffic lanes. Widespread bicycle riding, especially where bicycle lanes are available, may help to reduce traffic congestion. Riding a bicycle, especially where bicycle lanes are available, may allow a commuter to avoid congested traffic, as well as enabling the commuter to exercise while commuting.

A commuter who travels long distances may combine riding a bicycle with other forms of transportation. For example, a commuter may ride a bicycle to a train station or bus stop, and ride public transportation vehicles for the remainder of the trip. In this case, the bicycle may be parked near the station or stop until the commuter returns. In locations where bicycle theft is common, the bicycle must be locked, or otherwise secured, until the commuter returns. Sometimes, it may be necessary to ride a bicycle from the destination station or stop to the final destination of the commute. In general, it is not possible to carry the bicycle on public transportation. In this case, it is necessary to arrange for another bicycle to be waiting near the destination station or stop. In some locations, bicycle rental or lending systems have been instituted in order to encourage bicycle use. Under these systems, a municipality or other organization provides bicycle lending facilities at various locations scattered about a metropolitan area or other region. A person wishing to ride a bicycle borrows a bicycle from one of the facilities. The person then may use the bicycle to travel about the region, returning the bicycle when finished to the same or a different facility of the system.

On the other hand, riding a bicycle may present difficulties to a commuter. When the route involves long distances, or uphill rides, a commuter riding a bicycle may find traveling difficult. Pedaling a bicycle long distances, especially during hot weather, may result in a commuter arriving at the workplace or other destination fatigued or perspiring. In addition, a commuter may be, on occasion, too tired to pedal a bicycle. For this reason, electric motors for powering bicycles have been proposed. The electric motor is provided with controls that enable the rider to govern the amount of power that the motor produces, as desired. In general, an electric motor attaches to the frame of a bicycle and applies power to a component of the drive train of the bicycle.

An electric motor that is not in use, however, adds extra weight to the bicycle, and may interfere with pedaling the bicycle. In addition, an electric motor may increase the value of the bicycle to which it is attached, making the motorized bicycle a more tempting target for thieves. For these reasons, bicycle motors are sometimes designed to be easily removable from the bicycle.

U.S. Pat. No. 6,497,299 (Sinclair et al.) describes a drive apparatus for a cycle in the form of an electric motor and belt that is pressed against a tire of the bicycle. The electric motor drives the tire by means of friction. When not in use, the apparatus is raised above the tire so as not to impede the motion of the tire when being pedaled. However, such an apparatus may be too heavy to be easily portable unless its weight is reduced by reducing its power output or capacity. However, reduced power output and capacity may be impractical or commercially unacceptable. Gobr in WO 95/15276 describes a removable auxiliary drive for a bicycle. The heavy components of the drive, such as the battery and motor, are in a single drive unit. The drive unit may be removed from, or placed on, a bicycle that is equipped with an appropriate rack above the rear wheel. However, the drive is not designed for lightness, such as may enable a commuter to carry the drive on public transportation. The drive unit includes a roller that is rotated by the electric motor, and which is designed to turn the rear tire by means of friction. When the bicycle has a rear fender, the rear fender must include an opening that can accommodate the roller. However, driving a bicycle wheel by means of friction may not be a very efficient method of transmitting power to the wheel. This is especially true when riding over wet surfaces such that the friction between the roller and tire is reduced. As a result of the reduced efficiency in transmitting power, the auxiliary drive may require a heavy battery.

U.S. Pat. No. 7,185,726 (Young) describes a bicycle with power assist. Rear panniers hold batteries and a motor assembly. The bicycle is provided with a rack designed for holding the panniers. The panniers fit over the rear wheel of the bicycle. The motor assembly engages modified elements of the drive train of the bicycle in order to power the bicycle. For example, the motor assembly may engage a shaft added to the axle of the rear wheel, or another element added of the rear wheel drive mechanism, transferring power to the wheel. The pannier assembly, although designed to be easily attachable and detachable, is not designed to be lightweight or easily carried by the rider.

US 2007/0222170 (Sasnowski et al.) describes a bicycle with a power assist module. The module applies power directly to gear sharing a common axle with the chainwheel of the bicycle, requiring extensive mechanical modification of the bicycle.

Therefore, there is a need for a removable electric motorized drive for powering a bicycle, having a motor assembly is easily attachable to the frame of the bicycle and easily detachable. Furthermore, there is a need for a compact and light, but efficient, drive, with a lightweight motor assembly and battery, that is easily portable by a commuter riding on public transportation. In order to accommodate the drive, modification to the bicycle should not require extensive reconstruction of the bicycle.

It is an object of the present invention to provide a lightweight, easily attachable and detachable, efficient, and portable motorized drive for a bicycle.

Other aims and advantages of the present invention will become apparent after reading the present invention and reviewing the accompanying drawings.

SUMMARY OF THE INVENTION

There is thus provided, in accordance with some embodiments of the present invention, a portable removable apparatus for powering a bicycle driven by a bicycle chain. The apparatus includes a portable and removable drive unit for propelling the bicycle. The drive unit includes an electric motor and an output shaft rotatable by the electric motor with a sprocket coaxially affixed to the shaft adapted to engage to a portion of the bicycle chain. The apparatus also includes a bracket adapted to be fixed to a frame of the bicycle and to be in bearing contact with the output shaft for supporting the output shaft. The apparatus also includes at least one additional support for supporting the drive unit on the bicycle frame so that lateral torque on the drive unit when engaged with the chain and operating is substantially eliminated.

Furthermore, in accordance with some embodiments of the present invention, the bracket and the additional support are configured so as to facilitate attaching the drive unit to the bicycle by facilitating engaging the sprocket with the chain and displacing a portion of the chain by displacing a derailleur cage of the bicycle.

Furthermore, in accordance with some embodiments of the present invention, the additional support is a part of a second bracket.

Furthermore, in accordance with some embodiments of the present invention, the additional support is a part of the bracket.

Furthermore, in accordance with some embodiments of the present invention, the apparatus includes a power source of variable electric power to power the electric motor.

Furthermore, in accordance with some embodiments of the present invention, the power source is portable and removable.

Furthermore, in accordance with some embodiments of the present invention, the power source when removed is attachable to the drive unit when removed to form a single portable unit.

Furthermore, in accordance with some embodiments of the present invention, the power source is rechargeable.

Furthermore, in accordance with some embodiments of the present invention, the output shaft is rotatable by the electric motor via a reduction gear.

Furthermore, in accordance with some embodiments of the present invention, the reduction gear includes a component selected from a group consisting of: a planetary gear, a pinion gear, and an overrunning clutch.

Furthermore, in accordance with some embodiments of the present invention, the bearing contact includes a bearing mounted on the output shaft.

Furthermore, in accordance with some embodiments of the present invention, the point of the bearing contact with the output shaft, a tensioned segment of the bicycle chain, and the additional support are substantially coplanar Furthermore, in accordance with some embodiments of the present invention, a throttle lever for controlling the electric motor is an adapted gear shift lever.

There is further provided, in accordance with some embodiments of the present invention, a portable removable apparatus for powering a bicycle. The apparatus includes a portable and removable drive unit for rotating the tire to propel the bicycle. The drive unit includes an electric motor adapted to turn an output shaft with a drive pulley, an idler pulley on an axle, and a flexible belt looped around the drive pulley and the idler pulley. The apparatus further includes a bracket adapted to be fixed to a frame of the bicycle, and adapted to hold and apply tension to the output shaft and the axle so as to hold the belt taut against the drive pulley and the perimeter of a tire of the bicycle.

Furthermore, in accordance with some embodiments of the present invention, the belt is a timing belt with outwardly facing teeth that are adapted to engage grooves in the perimeter of the tire.

Furthermore, in accordance with some embodiments of the present invention, the apparatus includes a source of variable electric power to power the electric motor.

Furthermore, in accordance with some embodiments of the present invention, the power source is portable and removable.

Furthermore, in accordance with some embodiments of the present invention, the power source when removed is attachable to the drive unit when removed to form a single portable unit.

Furthermore, in accordance with some embodiments of the present invention, the power source is rechargeable.

Furthermore, in accordance with some embodiments of the present invention, the belt has inwardly facing teeth and the drive pulley has grooves adapted to engage the inwardly facing teeth.

Furthermore, in accordance with some embodiments of the present invention, the tire is a rear tire.

Furthermore, in accordance with some embodiments of the present invention, a throttle lever for controlling the electric motor is an adapted gear shift lever.

There is further provided, in accordance with some embodiments of the present invention, a method for attaching a removable drive unit t with a rotatable sprocket to a bicycle with an affixed bracket. The method includes engaging the sprocket with a bicycle chain of the bicycle and moving the drive unit toward the bracket. Movement toward the bracket includes rotating the sprocket along the chain so as to engage successive portions of the chain and pulling on the chain in order to displace the engaged portion of the chain while displacing a derailleur cage of the bicycle. The movement of the drive unit continues until a structure of the drive unit attains a predetermined disposition with respect to a cooperating structure of the bracket.

There is further provided, in accordance with some embodiments of the present invention, a method for attaching a removable drive unit to a bicycle with an affixed bracket. The method includes providing a drive unit comprising an output shaft with a drive pulley, an idler pulley on an axle, and a flexible belt looped around the drive pulley and the idler pulley. The method further includes placing the output shaft and the axle within cooperating structures of the bracket, and adjusting the bracket so as to apply tension to the output shaft and the axle until the belt is held taut against the drive pulley and the perimeter of a tire of the bicycle.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 2B is an enlarged view of the battery unit bracket shown in FIG. 2A.

FIG. 2C is an enlarged view of the drive unit bracket shown in FIG. 2A.

FIG. 4A illustrates mounting the drive unit shown in FIG. 3B on an adapted bicycle.

DETAILED DESCRIPTION OF EMBODIMENTS

Figure 1:
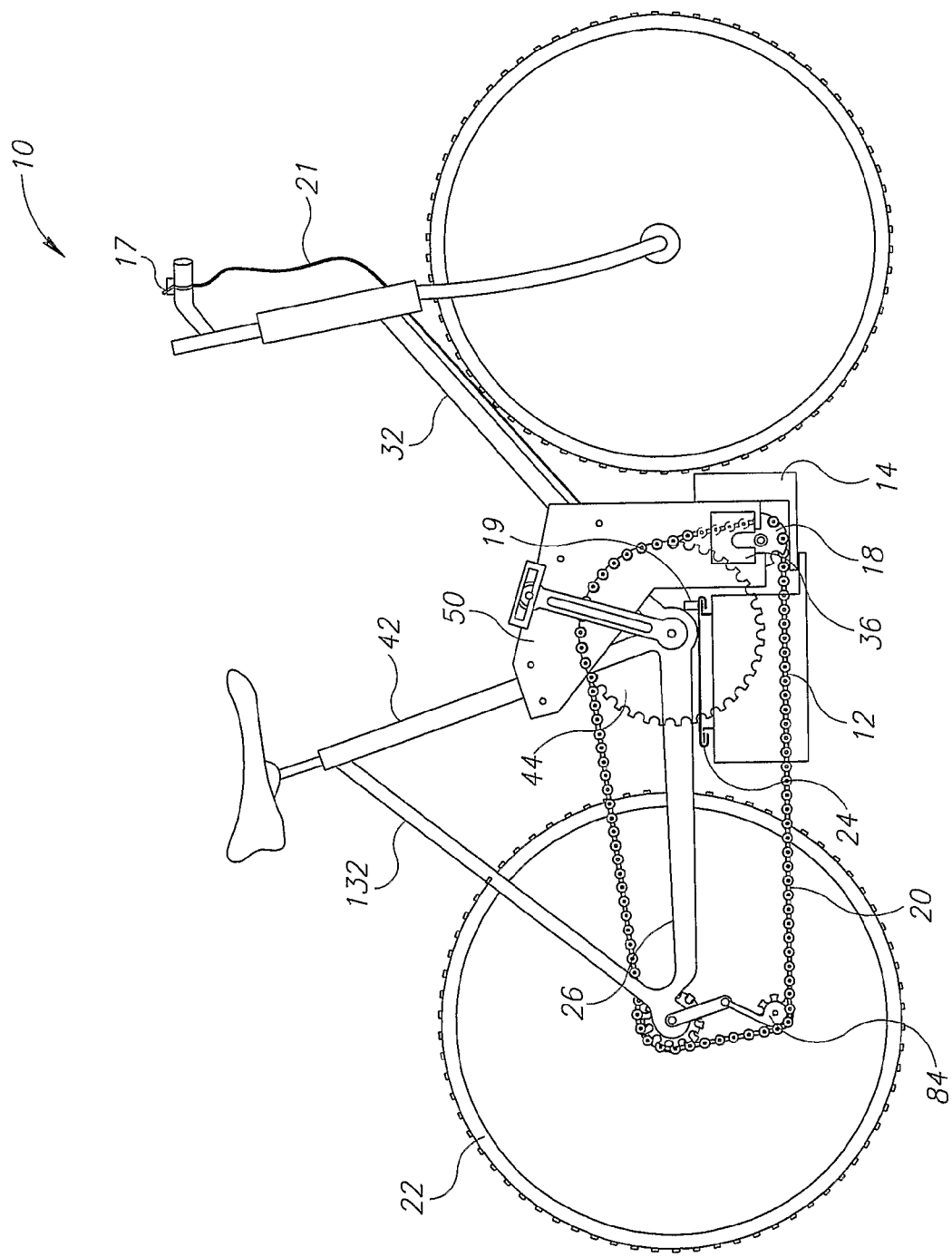
FIG. 1 illustrates a portable removable apparatus for powering a bicycle that engages the bicycle chain, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

A portable removable apparatus for powering a bicycle, in accordance with embodiments of the present invention, is a power unit designed to be quickly and easily installed on, and removed from, an adapted bicycle. A standard bicycle may be converted to an adapted bicycle by permanently attaching adapting components to the standard bicycle. Adapting parts are attached to the frame of the standard bicycle to serve as carrying brackets for various components of the power unit. Components of the power unit, either as a single unit or as separate detached components, may be installed or mounted on the carrying brackets without the use of tools. The power unit includes a source of electric power, such as, for example, a high energy-density rechargeable battery, and a lightweight motor. When installed on the adapted bicycle, one or more components of the power unit engage the drive train of the adapted bicycle. The power unit motor, powered by the power source, may drive the components that engage the drive train, thus propelling the adapted bicycle. The power unit may also include a controller that monitors the motor function and controls the power to the motor. The controller may monitor, for example, the temperature of the motor and its rotation speed. The controller then may control the power to the motor in accordance with the monitored functions. The controller may thus enable the motor to operate in an optimal manner.

Propelled by the power unit, a rider may ride the adapted bicycle to a destination. At the destination, the power unit may be turned off and removed from the adapted bicycle. The power unit is designed to be lightweight and compact, so that a removed power unit may be easily carried by a passenger riding on a public transportation vehicle.

A removable power unit may thus enable a commuter to commute long distances via a combination of bicycle transportation and public transportation. For example, the commuter may have previously charged a battery of the power unit by connecting the power unit to a charger at the commuter's home. For the first leg of the commute from home to work, the commuter disconnects the power unit from the charger and installs the power unit on an adapted bicycle. The adapted bicycle, which may belong to the commuter, or which may be borrowed or rented from a bicycle lending or rental system, has been parked near the commuter's home. The power unit may have been detached from the adapted bicycle, for example, overnight, to prevent theft of the power unit or to charge it. The commuter rides the bicycle to a train station or bus stop. During this ride, the commuter may choose to pedal the bicycle, or to use the power unit to propel the bicycle For example, the commuter may pedal the bicycle at a desired speed. When the commuter wishes to use the power unit to provide additional power to propel the bicycle, the commuter operates a throttle lever to cause the power unit to operate. At the train station or bus stop, the commuter parks the bicycle and removes the power unit. When removed from the bicycle, the power unit may be reconfigured to a carrying configuration designed for convenient carrying. For example, separate components of the power unit may be attached together or folded in such a way that all open surfaces and moving parts are covered. A carrying handle may be provided on the power unit in the carrying configuration. The commuter may then board the public transportation vehicle while carrying the power unit in its carrying configuration. At the destination station or stop, the commuter leaves the public transportation vehicle. The commuter at this point may mount the power unit on another adapted bicycle, again either belonging to the commuter or borrowed or rented, that is parked near the destination station or stop. The commuter may then ride the adapted bicycle to the commuter's workplace, park the bicycle, and remove the power unit from the bicycle to prevent its theft. The commuter may connect the power source power unit to a charger at the workplace, so as to ensure that the power source is charged for the trip home.

In this manner, a relatively inexpensive adapted bicycle may be left parked outside, while the expensive power unit may be kept in a more secure location. The ability to charge the power unit at both destinations of the commute enables the use of a battery of relatively low capacity, and thus of lower weight.

In some embodiments of the present invention, the power unit engages the chain of the adapted bicycle in order to propel the adapted bicycle.

Reference is now made to the accompanying figures.

FIG. 1 illustrates a portable removable apparatus for powering a bicycle that engages the bicycle chain, in accordance with some embodiments of the present invention. In this configuration, the power unit is mounted on adapted bicycle 10 as two separate component units: battery unit 12 and drive unit 14. Battery unit 12 may be mounted on or removed from battery unit bracket 24 without the use of tools. Drive unit 14 may be mounted on or removed from drive unit bracket 50 without the use of tools. Battery unit bracket 24 and drive unit bracket 50 may be permanently attached to the frame of adapted bicycle 10. Battery unit 12 contains one or more batteries that provide electrical power to drive unit 14 through power cable 16 (shown in FIG. 2A). The batteries may be rechargeable. A rider riding adapted bicycle 10 uses throttle 17 to control the electrical power output of battery unit 12. Moving throttle 17 changes the position of pivot bar 19 on battery unit bracket 24 via throttle cable 21. Pivot bar 19 controls circuitry in battery unit 12, for example, by adjusting a potentiometer of the circuitry, that controls the electrical power output of battery unit 12. Drive unit 14 includes an electric motor that, when powered by battery unit 12, causes drive sprocket 18 to rotate. Drive sprocket 18 engages and pulls bicycle chain 20. By pulling bicycle chain 20, drive unit 14 rotates rear wheel 22, propelling adapted bicycle 10.

Figure 2A:
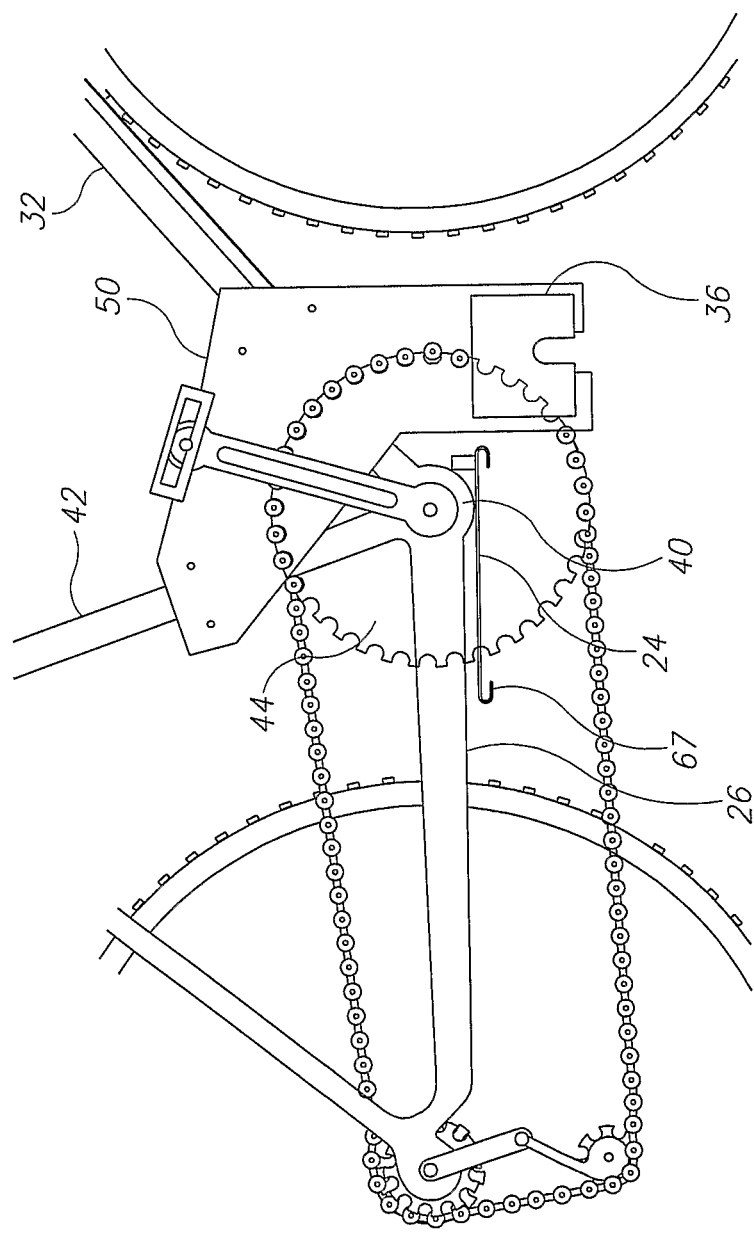
FIG. 2A illustrates the assembly of a battery unit bracket and a drive unit bracket, in accordance with some embodiments of the present invention.

FIG. 2A illustrates the assembly of a battery unit bracket and a drive unit bracket, in accordance with some embodiments of the present invention. Battery unit bracket 24 attaches to the bottom of chain stays 26 below bottom bracket 40. FIG. 2B is an enlarged view of the battery unit bracket shown in FIG. 2A. The rear end of battery unit bracket 24 is held fast to chain stays 26 by means of crosspiece 28. Crosspiece 28, placed above chain stays 26, is bolted fast to battery unit bracket 24 by means of bolt 30 and nut 31. The front end of battery unit bracket 24 is held to down tube 32, in front of bottom bracket 40, by curved clamp 34. Curved clamp 34 is bolted to battery unit bracket 24 using bolts 37 and nuts 38. Pivot bar 19 is screwed to the front of battery unit bracket 24. Pivot bar 19, through a mechanism described below, controls the amount of power supplied by battery unit 12, and thus the speed of adapted bicycle 10. Throttle cable 21 (FIG. 1) is attached to screw 23 on pivot bar 19. In a standard bicycle, throttle cable 21 would generally connect a front gear shifting lever to a front derailleur. In the adapted bicycle, the front derailleur is removed, and the cable 21 is detached from the front derailleur and attached to pivot bar 19. In adapting the bicycle, the largest front sprocket is permanently selected. The lower gear ratios, ordinarily used in climbing hills or in other situations where extra torque is required, are disabled in the adapted bicycle. In general, when extra torque is required, a rider of the adapted bicycle uses the power unit to add power to the bicycle. In this manner, the function of the gear shifting lever of a standard bicycle is modified to act as a throttle lever in the adapted bicycle.

Drive unit bracket 50 is clamped to the bicycle frame. The plane of drive unit bracket 50 lies between the plane of seat tube 42 and down tube 32, on the one hand, and the plane of chainwheel 44, on the other. Chainwheel 44 is represented in the Figures as being transparent, with structures behind chainwheel 44 being represented as fully visible. In general, the chainwheel may be opaque, or opaque with transparent openings. Drive unit bracket 50 is clamped to down tube 32 by means of curved clamps 46a and 46b, and to seat tube 42 by means of curved clamp 46c. Clamps 46a, 46b, and 46c are bolted to drive unit bracket 50. Shaft niche housing 36 is screwed onto drive unit bracket 50.

Figure 3B:
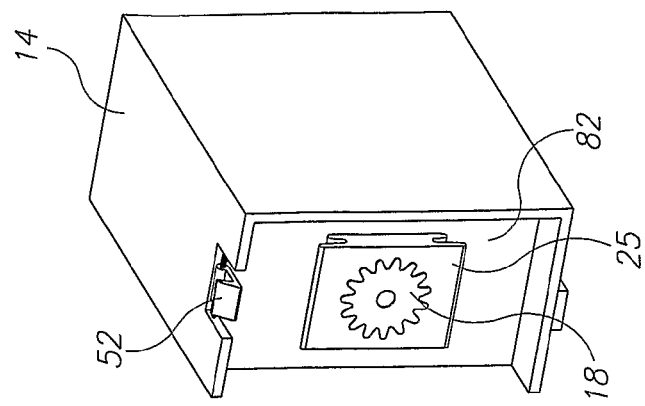
FIG. 3B shows the drive unit of the power unit shown in FIG. 3A.
Figure 3A:
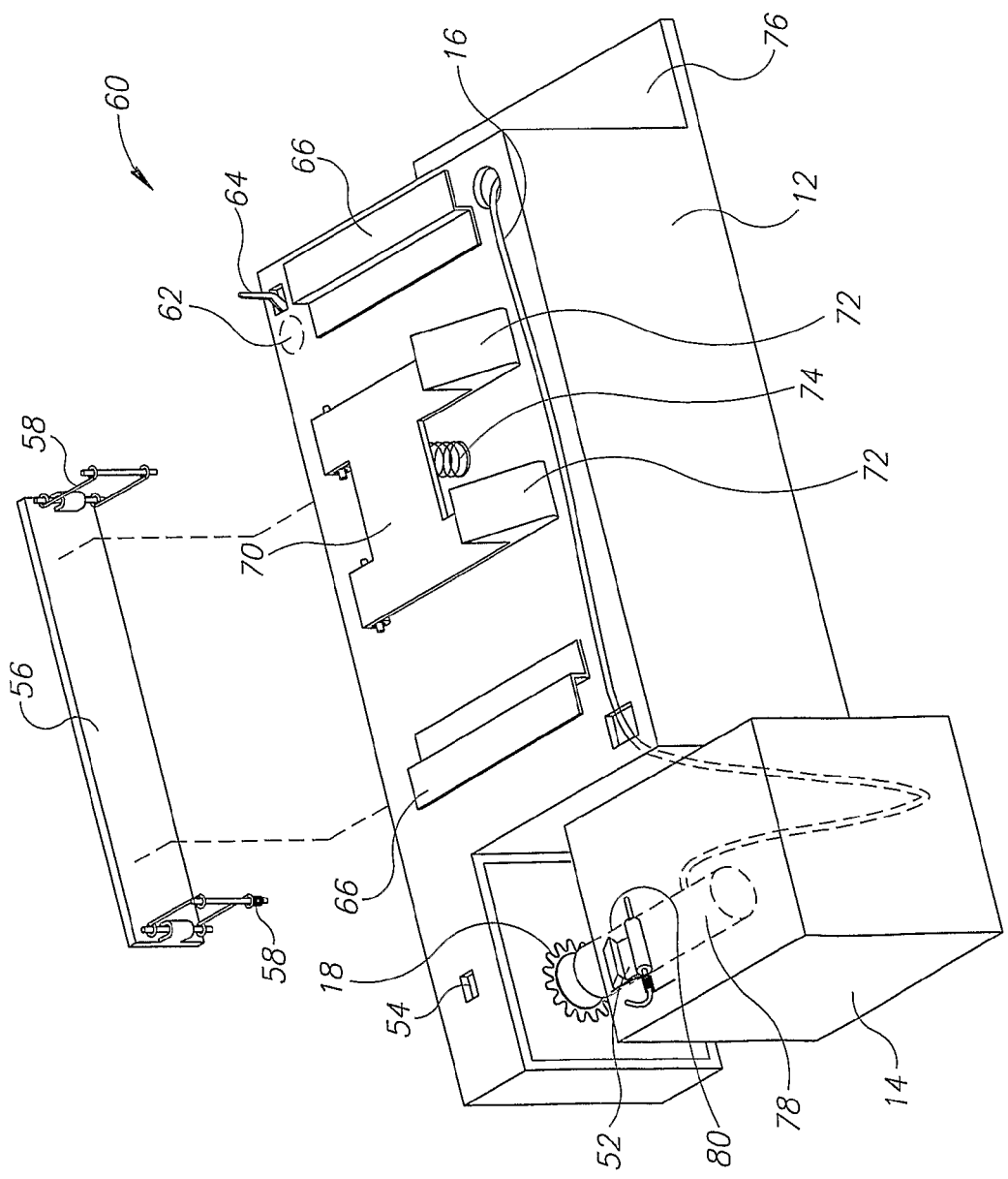
FIG. 3A shows components of the power unit shown in FIG. 1.

FIG. 3A shows components of the power unit shown in FIG. 1. FIG. 3B shows the drive unit of the power unit shown in FIG. 3A. Battery unit 12 and drive unit 14 may be latched together, by means of latch 52 and catch 54, into a single portable unit 60. Carrying handle 56 attaches to the side of battery unit 12. Springs 58 hold carrying handle 56 flush to the surface of battery unit 12, except when extended for the purpose of inserting a hand and carrying the portable unit 60.

Battery unit 12 includes one or more batteries (not shown), a controller (not shown), and a control circuit that includes variable resistor 62. A battery may be, for example, a lithium-ion polymer battery providing 14 V and having a capacity of 8 Ah. The resistance of variable resistor 62 is adjusted by means of resistor arm 64. When battery unit 12 is installed on the adapted bicycle, resistor arm 64 engages pivot bar 19 (shown in FIG. 2B). Moving pivot bar 19 moves resistor arm 64 and adjusts the resistance of variable resistor 62. Adjusting the resistance of variable resistor 62 adjusts the output power of battery unit 12. Output electrical power from battery unit 12 is conducted to drive unit 14 via power cable 16. In order to attach battery unit 12 to the adapted bicycle, guides 66 are slid into carrier rails 67 (shown in FIG. 2B) of battery unit bracket 24. Battery unit 12 is pushed into battery unit bracket 24 until teeth 72 of latch 70, pushed upward by spring 74, engage the edge of battery unit bracket 24. When teeth 72 engage battery unit bracket 24, battery unit 12 is held fast to the frame of the adapted bicycle.

Drive unit 14 includes electric motor 78 and reduction gear assembly 80. Electric motor 78 and reduction gear assembly 80 are attached to plate 82. Plate 82 and the other walls of drive unit 14 may function as a heat sink for heat generated by electric motor 78. For example, plate 82 and the walls of drive unit 14 may be constructed of a light, heat conducting metal such as aluminum. Electric motor 78 may be a lightweight motor, such as a motor designed for powering a radio controlled model airplane. Reduction gear assembly 80 allows a low torque, high speed electric motor 78 to rotate drive sprocket 18 at a low speed and with high torque. The number of teeth on drive sprocket 18 may be limited to a small number, for example, eight. The limited number of the teeth further contributes to the reduction. Thus, drive sprocket 18 may rotate and propel bicycle chain 20 (FIG. 1) of the adapted bicycle. For example, a lightweight Scorpion 4020-16 415 Kv motor may be used to rotate drive sprocket 18 via a reduction gear with a gear ratio of 1:13.

Figure 4B:
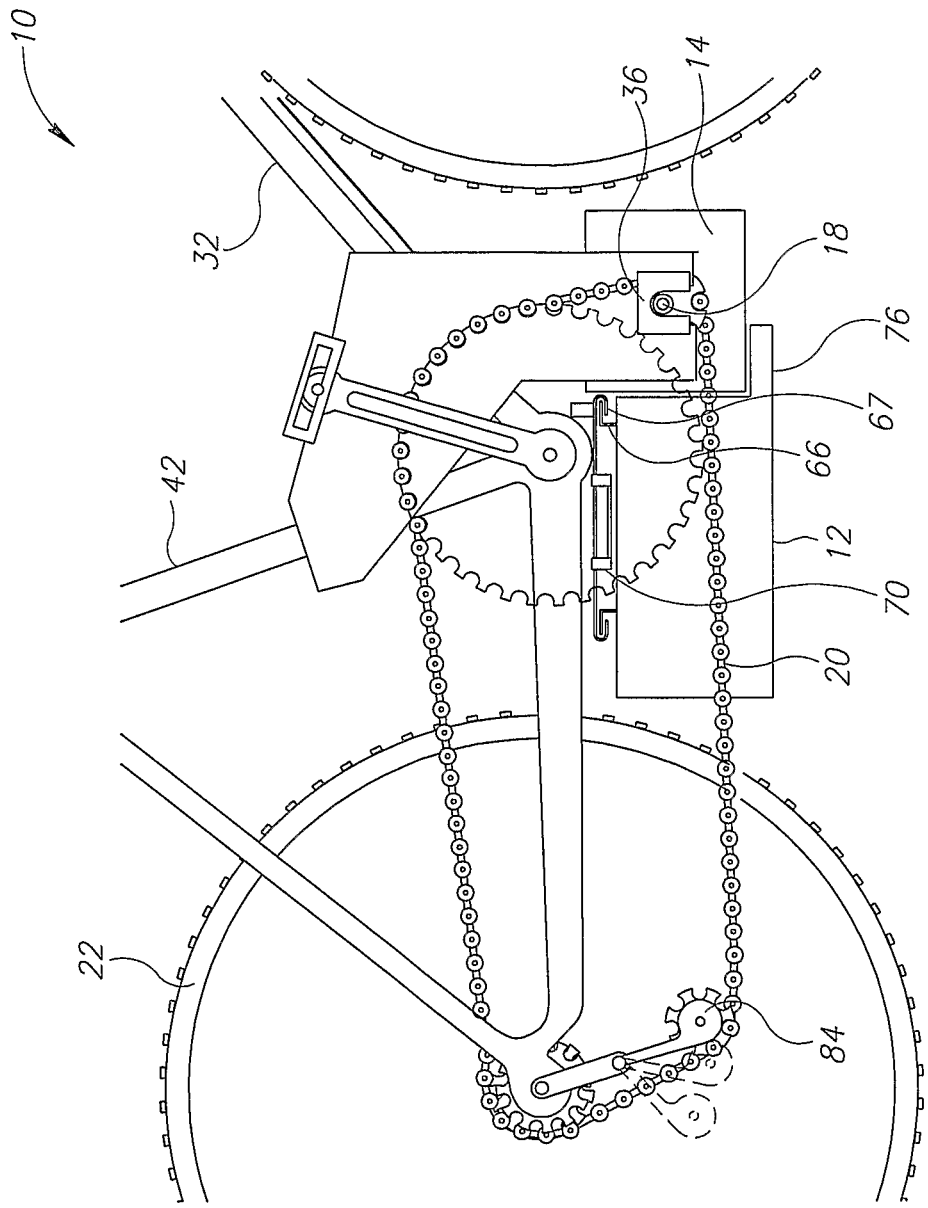
FIG. 4B illustrates the drive unit and battery unit as mounted on an adapted bicycle.
Figure 5A:
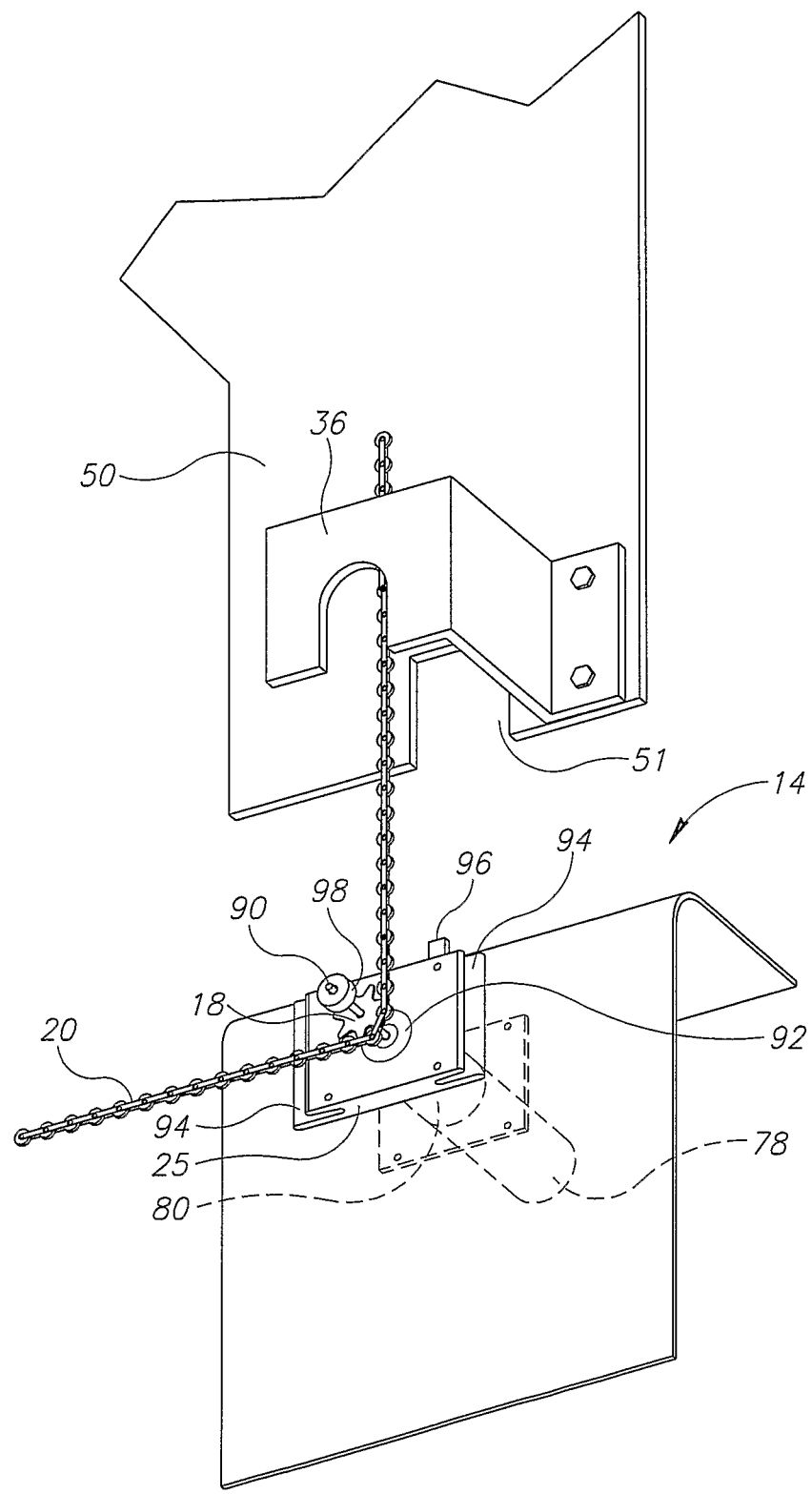
FIG. 5A is an enlarged view of the drive mechanism of a drive unit shown in FIG. 3B.

FIG. 4A illustrates mounting the drive unit shown in FIG. 3B on an adapted bicycle. Drive unit 14 has been separated from the battery unit. Drive unit 14 is held such that drive sprocket 18 is engages bicycle chain 20. Drive unit 14 is moved forward toward drive unit bracket 50, with drive sprocket 18 engaging bicycle chain 20. While drive unit 14 is being moved forward, a freewheel or overrunning clutch mechanism built into reduction gear assembly 80 enables drive sprocket 18 to rotate freely. As drive sprocket 18 rotates as it is moved forward, drive sprocket 18 travels along, and engages successive portions of, bicycle chain 20. Drive unit 14 is moved forward, pulling on bicycle chain 20 and applying tension to and displacing rear derailleur cage 84, until drive sprocket 18 is placed within niche housing 36 (as shown in FIG. 1). Grooves 94 fit over the edges of notch 51 (as shown in FIG. 5A). As a result of mounting drive unit 14 onto drive unit bracket 50, the travel of rear derailleur cage 84 may be limited. For this reason, in adapting a bicycle so as to make an adapted bicycle, it may be necessary to add several links to bicycle chain 20, or to reduce the distance between rear wheel 22 and chainwheel 44.

When mounting the power unit on an adapted bicycle, drive unit 14 is mounted on drive unit bracket 50 before mounting battery unit 12 on battery unit bracket 24. Once drive unit 14 is mounted on drive unit bracket 50, battery unit 12 is mounted on battery unit bracket 24. FIG. 4B illustrates the drive unit and battery unit shown in FIG. 3A mounted on an adapted bicycle. When battery unit 12 is mounted on battery unit bracket 24, extension 76 of battery unit 12 holds drive unit 14 in place when drive unit 14 is idle (such as when the adapted bicycle is being pedaled). When drive unit 14 applies torque to drive sprocket 18, tension in bicycle chain 20 maintains the vertical position of drive unit 14.

Figure 4C:
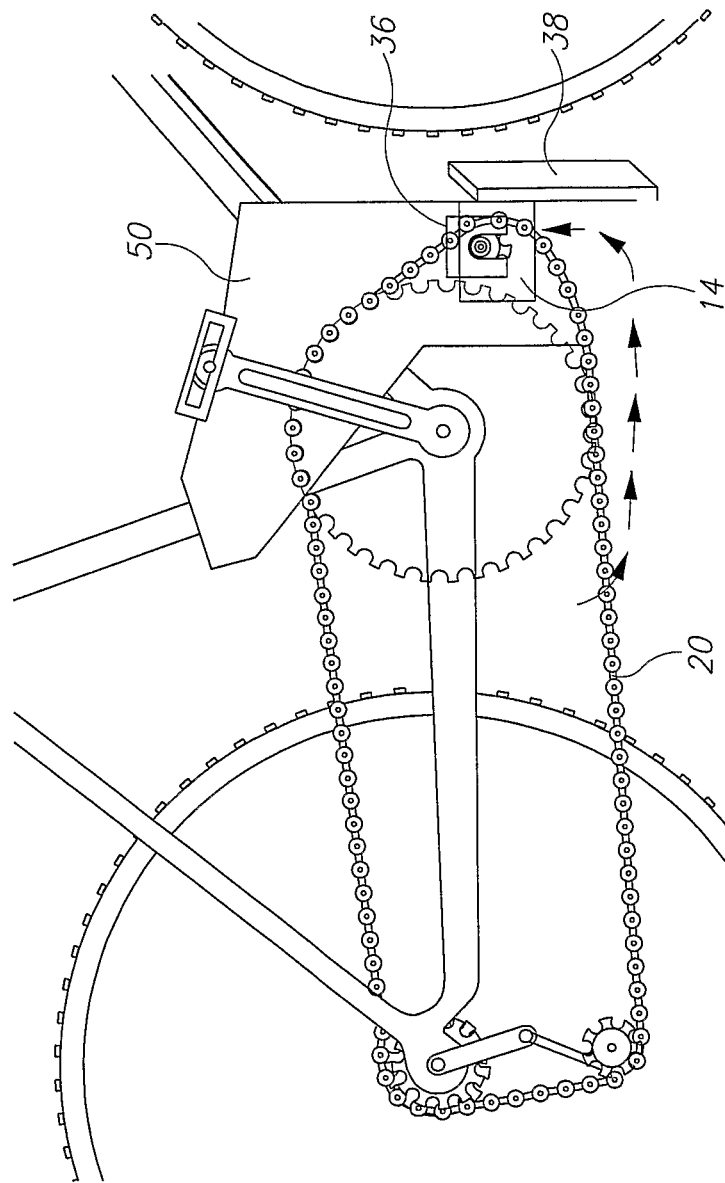
FIG. 4C shows an alternative arrangement for mounting the drive unit on an adapted bicycle, in accordance with some embodiments of the present invention.

FIG. 4C shows an alternative arrangement for mounting the drive unit on an adapted bicycle, in accordance with some embodiments of the present invention. In this embodiment, drive unit bracket 50 is provided with drive unit guide 38. Drive unit guide 38 assists in guiding the placement of drive unit 14 to its mount position on drive unit bracket 50.

When removing the power unit from the adapted bicycle, the procedure is reversed. The battery unit is first removed from the battery unit bracket. Removing the battery unit enables the drive unit to be removed. When removing the drive unit, force is applied to the sprocket to cause the drive sprocket to turn backward. Alternatively, the rear of the bicycle may be raised so that the bicycle chain may be pulled backward. Alternatively, the drive unit may be provided with a control that causes the motor to turn backward for a short distance, thus releasing the drive sprocket of the drive unit from the bicycle chain.

Figure 5B:
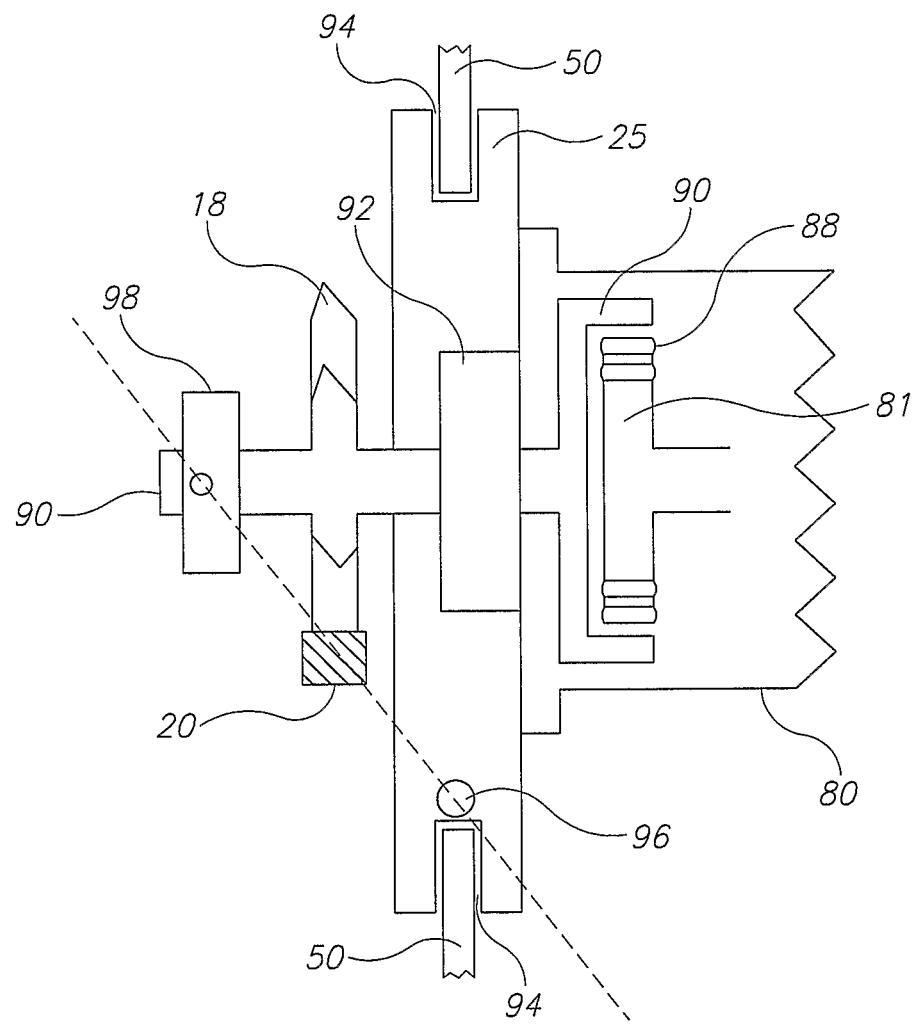
FIG. 5B is a cross-sectional side view of the drive mechanism shown in FIG. 5A.

FIG. 5A is an enlarged view of the drive mechanism of the drive unit shown in FIG. 3B. FIG. 5B is a cross-sectional side view of the drive mechanism shown in FIG. 5A. Electric motor 78 drives a reduction gear in the form of planetary gear 80. Output shaft 81 of planetary gear 80 drives shaft 90 via overrunning clutch 88. Overrunning clutch 88 enables propelling the adapted bicycle by pedaling when electric motor 78 is not operating. Output shaft 90 is supported by output shaft bearing 92. Outer bearing 98 may mounted on output shaft 90 on the side of drive sprocket 18 opposite planetary gear 80. Planetary gear 80 is mounted to guide plate 25. When drive unit 14 is mounted on drive unit bracket 50, guide plate 25 fits into notch 51. Grooves 94 of guide plate 25 may include a layer of flexible material that can damp vibrations. Grooves 94 fit loosely over the edges of notch 51, such that drive unit 14 is free to move somewhat. When electric motor 78 is providing power, drive sprocket 18 pulls drive unit 14 upward along bicycle chain 20. The upper limit of the upward movement of drive unit 14 is determined by contact of outer bearing 98 with shaft niche housing 36, and contact of projection 96 on guide plate 25 with the upper edge of notch 51. Drive unit 14 is pulled upward by a tensioned segment of the bicycle chain 20 toward drive unit bracket 50. Further upward movement of drive unit 14 is prevented by contact of outer bearing 98 and projection 96 with shaft niche housing 36 and drive unit bracket 50, respectively.

The points of contact of outer bearing 98 and projection 96 with drive unit bracket 50 are arranged on opposite sides of the region where drive sprocket 18 pulls chain 20 so as to minimize bending stress on drive unit 14. For example, the points of contact and the tensioned segment of the chain that pulls drive unit 14 upward may be substantially coplanar. In particular, the points of contact and a point of the tensioned segment of the chain may be substantially collinear. A point of contact may either refer to a single point of contact, or to the effective point of contact of an extended surface of contact. As used in this description, a point of contact may refer to direct contact between structures, or to contact via an intervening structure that transmits a contact force. Outer bearing 98 is positioned on output shaft 90 such that when drive unit 14 is pulled upward by chain 20, the net lateral torque applied to drive unit 14 is close to zero. Alternatively, output shaft 90 may be otherwise in bearing contact with a point on shaft niche housing 36 or on another point of the drive unit bracket. As used in this description, "bearing contact" refers to reduced friction contact between a rotating part and a stationary part, either by means of a bearing mounted at the point of contact, or by means of a reduced friction surface on either part. "Lateral torque" as used in this description refers to a torque tending to tilt a plane defined by drive sprocket 18. Therefore, the walls of grooves 94 tend to remain parallel to the edges of notch 51. This configuration reduces the mechanical stress applied by drive unit 14 on drive unit bracket 50, enabling a structurally lightweight drive unit 14.

Figure 6A:
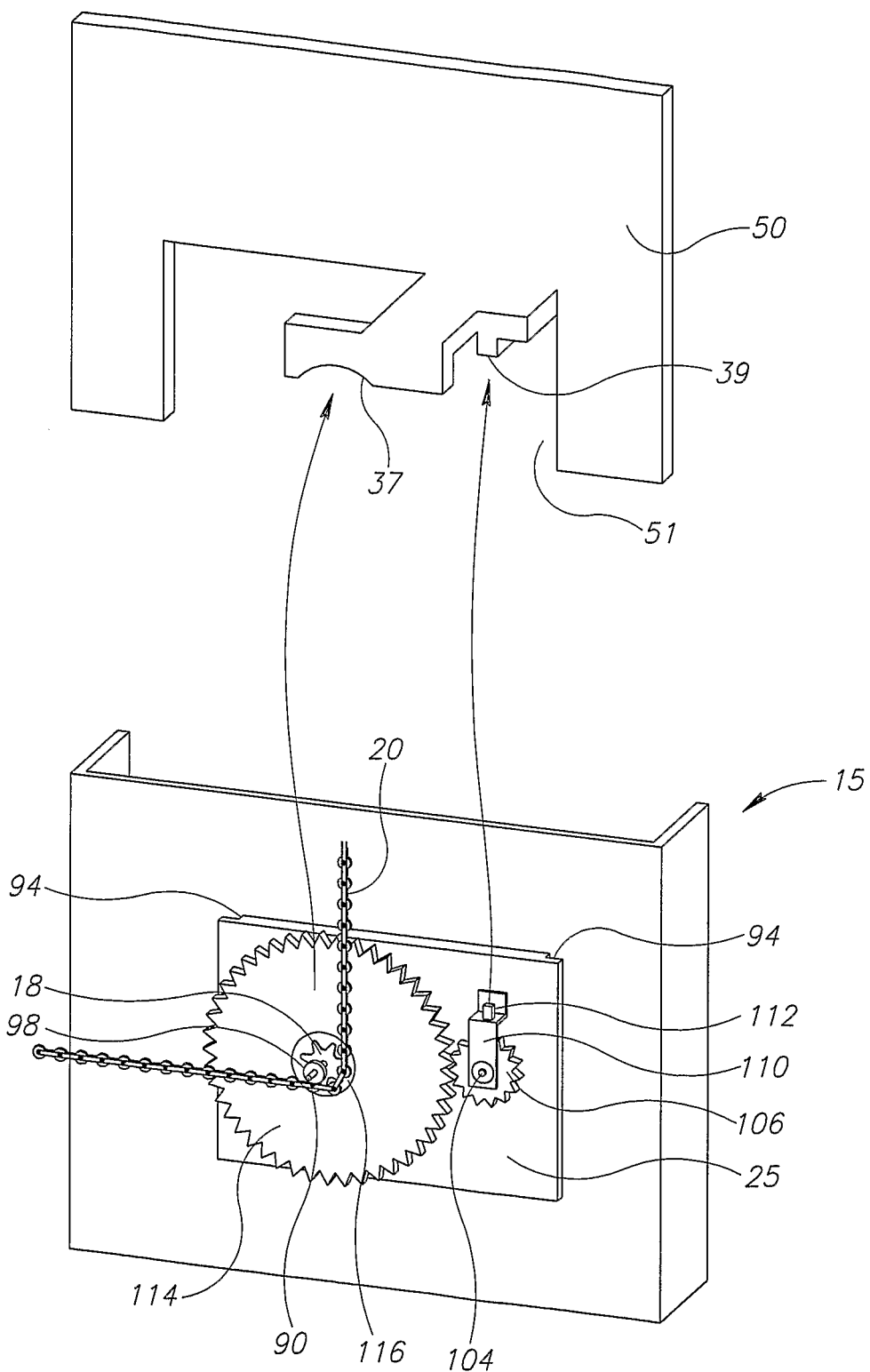
FIG. 6A is an enlarged view of an alternative drive mechanism in accordance with some embodiments of the present invention.
Figure 6B:
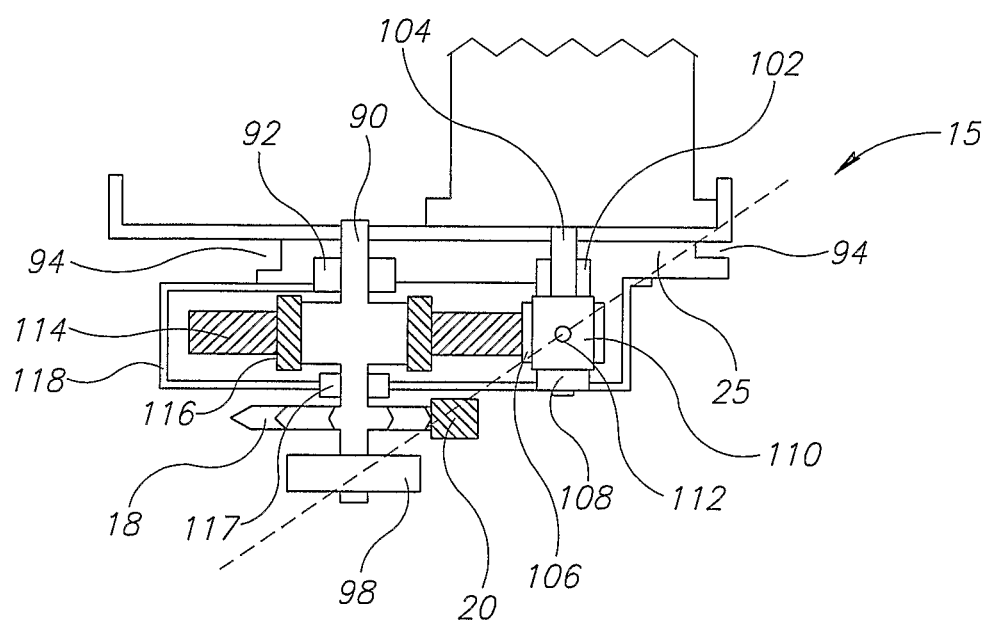
FIG. 6B is a cross-sectional side view of the drive mechanism shown in FIG. 6A.
Figure 6C:
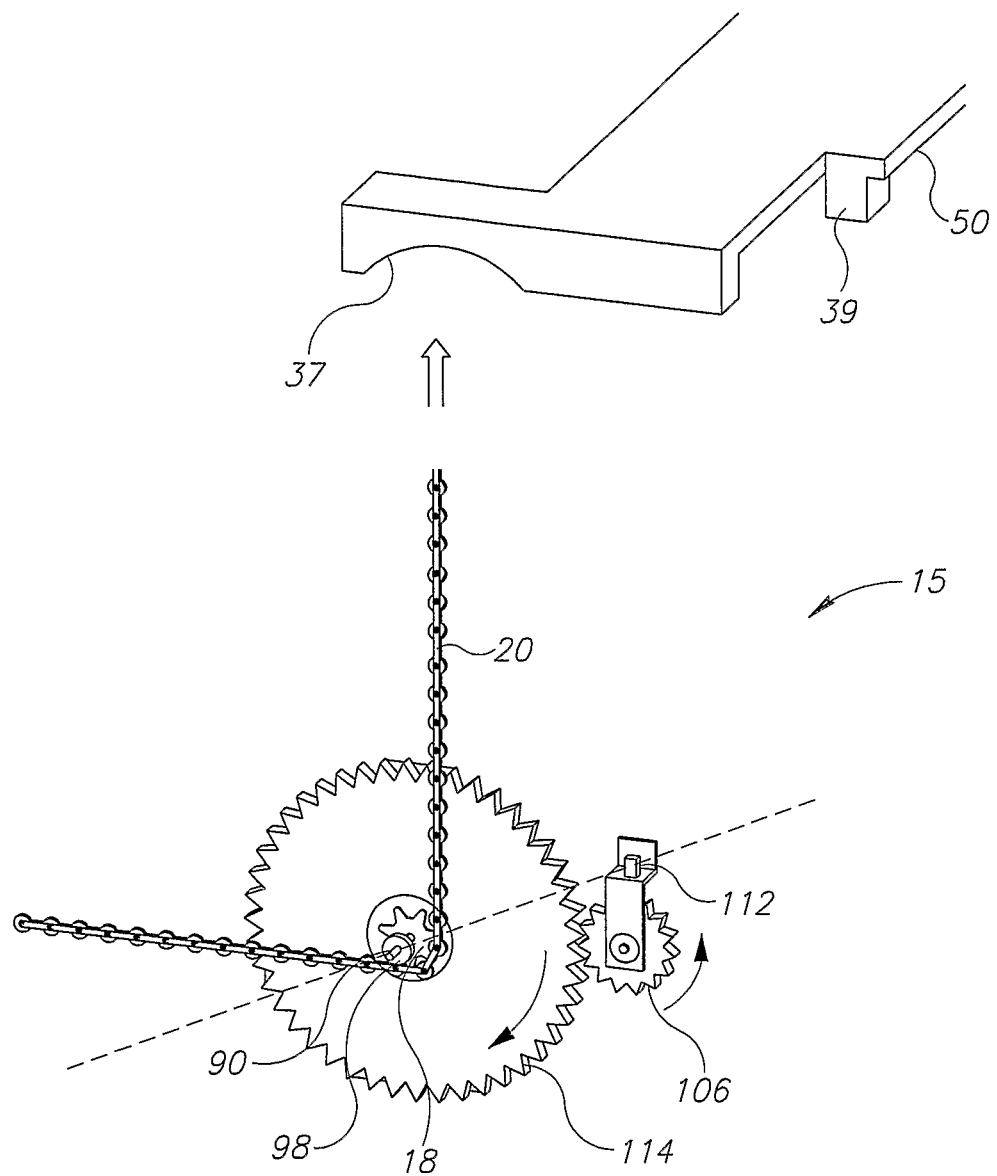
FIG. 6C is a simplified drawing of components of the drive mechanism shown in FIG. 6A.

FIG. 6A is an enlarged view of an alternative drive mechanism of a power unit in accordance with some embodiments of the present invention. FIG. 6B is a cross-sectional side view of the drive mechanism shown in FIG. 6A. FIG. 6C is a simplified drawing of components of the drive mechanism shown in FIG. 6A. In alternate drive unit 15, bearing 102 supports motor shaft 104. Motor shaft 104 turns pinion gear 106. Bearing 108 is at the end of motor shaft 104. Output shaft bearing 92 supports output shaft 90. Gear 114 is mounted on output shaft 90. Gear 114 rotates about output shaft 90, connected through overrunning clutch 116. Overrunning clutch 116 enables pedaling when the motor is not operating. Pinion gear 106 and gear 114 may be sealed within protective case 118. Protective case 118 may be constructed, for example, of plastic. Bearing 117 fits between output shaft 90 and protective case 118. Drive sprocket 18 and outer bearing 98 are fixed to output shaft 90. When drive unit 15 is operating, sprocket 18 pulls drive unit 15 upward along bicycle chain 20 into notch 51 of drive unit bracket 50. Grooves 94 of guide plate 25 may be coated with a flexible layer for damping vibrations. Grooves 94 fit loosely over the edges of notch 51, such that drive unit 15 is free to move somewhat. In order to limit the upward motion of drive unit 15, the top of groove 51 is provided with niche 37 and bar 39. At the upper limit of the motion of drive unit 15, bearing 98 fits into niche 37, and projection 112 on pinion gear housing 110 abuts bar 39. Drive unit 15 is pulled upward by chain 20 toward drive unit bracket 50. Further upward movement of drive unit 15 is prevented when niche 37 and bar 39 contact and apply force to outer bearing 98 and projection 112, respectively. Alternatively, a output shaft 90 may contact a bearing located on niche 37.

The points of contact of outer bearing 98 and projection 96 with drive unit bracket 50 are arranged on opposite sides of the region where drive sprocket 18 pulls chain 20 so as to minimize bending stress on drive unit 15. Outer bearing 98 is so positioned on output shaft 90 such that when drive unit 15 is pulled upward by chain 20, the net lateral torque applied to drive unit 15 is close to zero. Therefore, the walls of grooves 94 tend to remain parallel to the edges of notch 51. This configuration reduces the mechanical stress applied by drive unit 15 on drive unit bracket 50, enabling a structurally lightweight drive unit 15. In addition, when transferring the drive power, the drive unit will have some freedom, limited only by grooves 94 and the edges of notch 51.

In general, a bicycle vibrates as it moves. Therefore, the drive unit may be shaken. The structure of drive unit 14, as shown in FIG. 5A and 5B, or of alternate drive unit 15 as shown in FIGS. 6A, 6B and, 6C, enables limited freedom of movement of the drive unit This freedom of movement may serve to relieve any stresses on shaft 90 caused by vibration of the drive unit. The vibration may be damped by the flexible layer applied to grooves 94.

Figure 7:
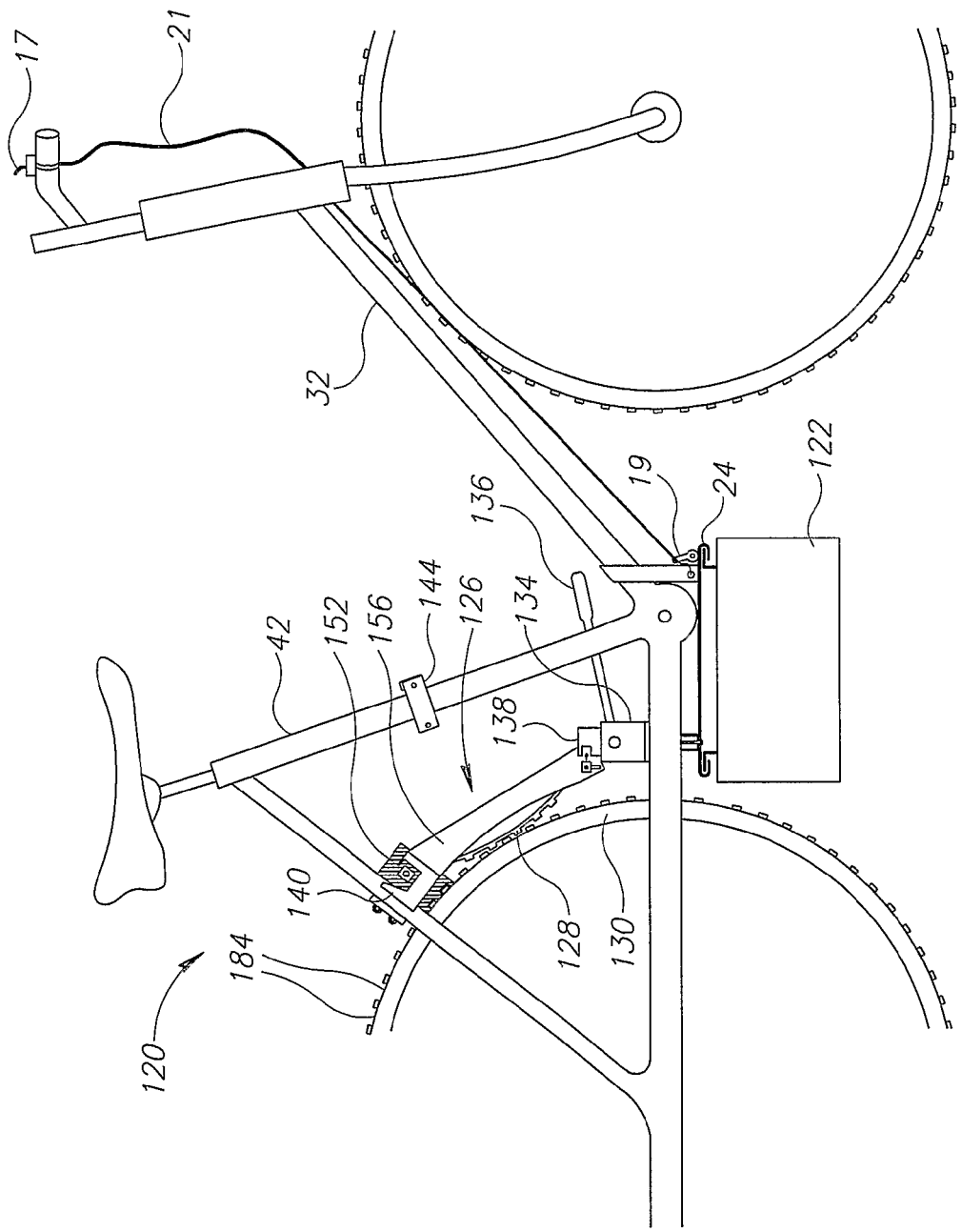
FIG. 7 illustrates a portable removable apparatus for powering a bicycle that employs a timing belt to engage a bicycle tire, in accordance with some embodiments of the present invention.

In some embodiments of the present invention, the power unit propels an adapted bicycle by powering a timing belt that engages matching grooves on a tire of the adapted bicycle. FIG. 7 illustrates a portable removable apparatus for powering a bicycle that employs a timing belt to engage a bicycle tire, in accordance with some embodiments of the present invention. The power unit is mounted on adapted bicycle 120 as two separate component units: battery unit 122 and drive unit 126. Battery unit 122 may be quickly mounted on or removed from battery unit bracket 24 without the use of tools. Drive unit 126 may be quickly mounted on or removed from drive unit upper bracket 140 and drive unit lower bracket 134 without the use of tools. Battery unit bracket 24 and drive unit brackets 140 and 134 are permanently attached to the frame of adapted bicycle 120. Battery unit 122 is similar in form and function to battery unit 12 described above. The output electric power of battery unit 122 may be controlled by throttle 17 via throttle cable 21 and pivot bar 19. Drive unit 126, when powered by battery unit 122, drives timing belt 128. Outwardly facing teeth on timing belt 128 engage matching grooves 184 on a grooved surface, or tread, on the outer perimeter of tire 130, in this case the rear tire. In transforming a standard bicycle to adapted bicycle 120, a standard tire may be replaced with a tire 130 having grooves 184 as part of its tread. Alternatively, tire 130 may be a standard tire of a standard bicycle. In this case, the timing belt may be provided with teeth that are shaped so as to match existing grooves in the tread the standard tire. By engaging grooves 184 with moving timing belt 128, drive unit 126 rotates tire 130, propelling adapted bicycle 120.

Figure 8:
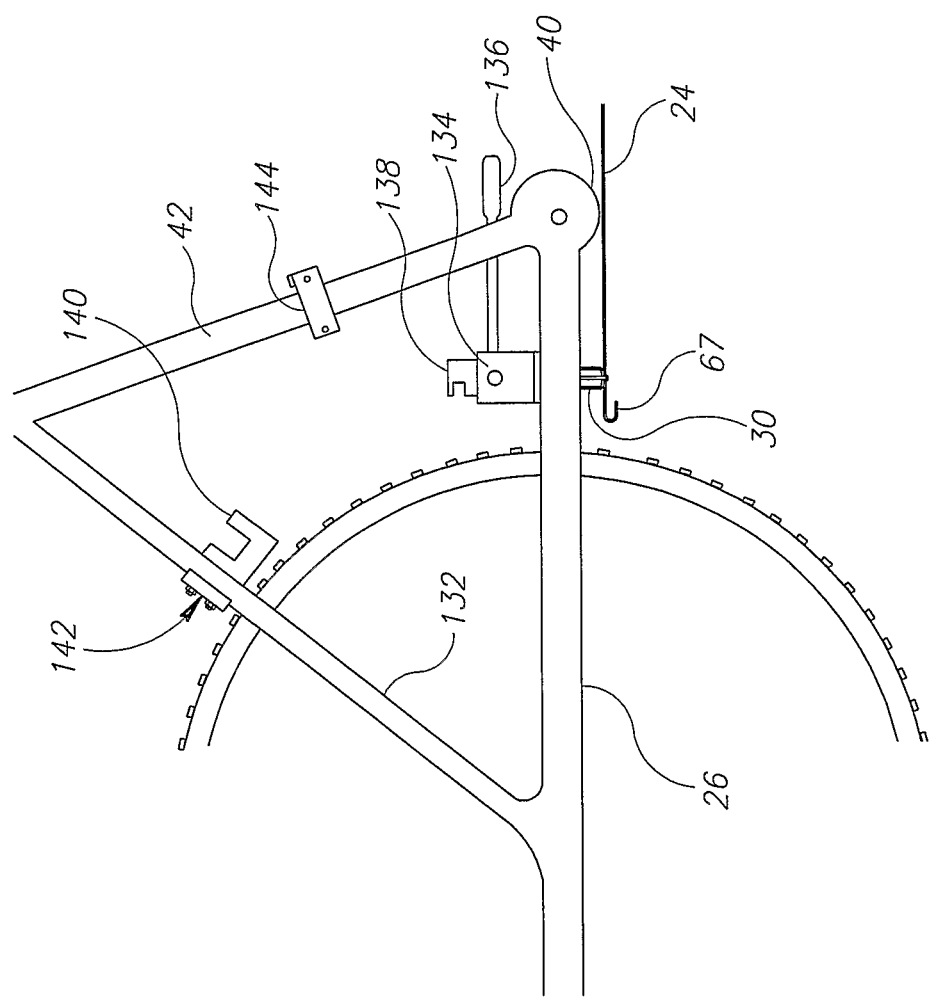
FIG. 8 illustrates the assembly of power unit mounting brackets, in accordance with some embodiments of the present invention.

FIG. 8 illustrates the assembly of a drive unit bracket, in accordance with some embodiments of the present invention. Battery unit bracket 24 attaches to the bottom of chain stays 26 below bottom bracket 40. Attachment is similar to that illustrated in FIG. 2B and described in the accompanying description.

Several elements are attached to the bicycle frame in order to adapt the bicycle to carry the drive unit. Drive unit lower bracket 134 is attached to chain stays 26 and battery unit bracket 24 by means of bolt 30. Drive unit lower bracket 134 includes tightening handle 136. Tightening handle stop 144 is clamped to seat tube 42. Drive unit upper bracket 140 attaches to seat stays 132 by means of clamp 142.

Figure 9:
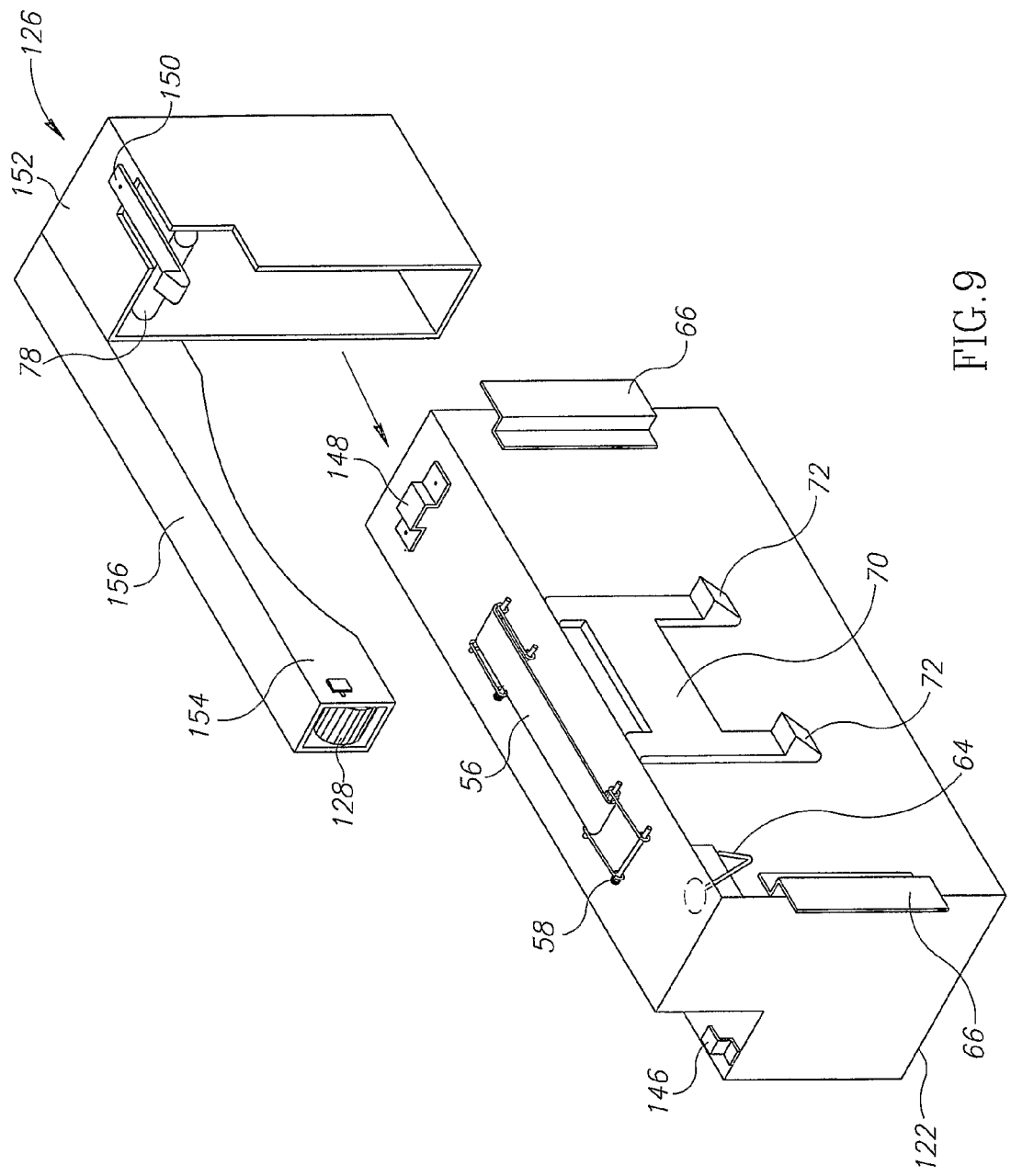
FIG. 9 shows components of the power unit shown in FIG. 7.

FIG. 9 shows components of the power unit shown in FIG. 7. Battery unit 122 and drive unit 126 may be latched together, using latch 150 and catch 148 as well as tab 146, into a single portable unit. Carrying handle 56 attaches to the side of battery unit 122. Springs 58 hold carrying handle 56 flush to the surface of battery unit 122, except when extended for the purpose of inserting a hand and carrying the portable unit.

Figure 10:
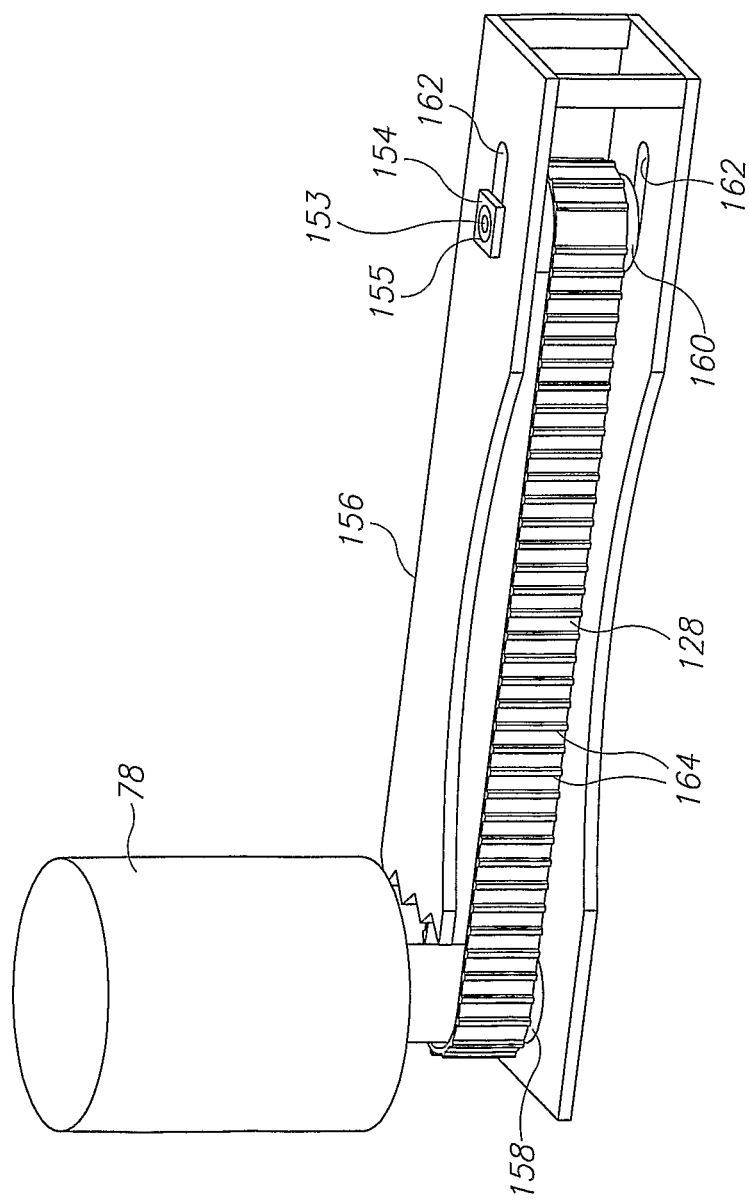
FIG. 10 shows a timing belt drive unit in accordance with some embodiments of the present invention.

Drive unit 126 includes motor housing 152 and belt housing 156. FIG. 10 shows a timing belt drive unit in accordance with some embodiments of the present invention. Drive unit 126 is driven by electric motor 78. Electric motor 78 drives drive pulley 158. Drive pulley 158 drives timing belt 128. Timing belt 128 is looped around drive pulley 158 and idler pulley 160. Timing belt 128 is placed such that belt teeth 164 face the outside. Alternatively, the timing belt may have teeth on both its inner surface and its outer surface. In this case, the drive pulley may be in the form of a timing wheel with grooves on its outer surface matching teeth on the inner surface of the belt. Idler pulley 160 is confined within elongated openings 162 by square plates 154. Square plates 154 are attached to the end of axle 153 of idler pulley 160 via bearing 155.

Figure 11:
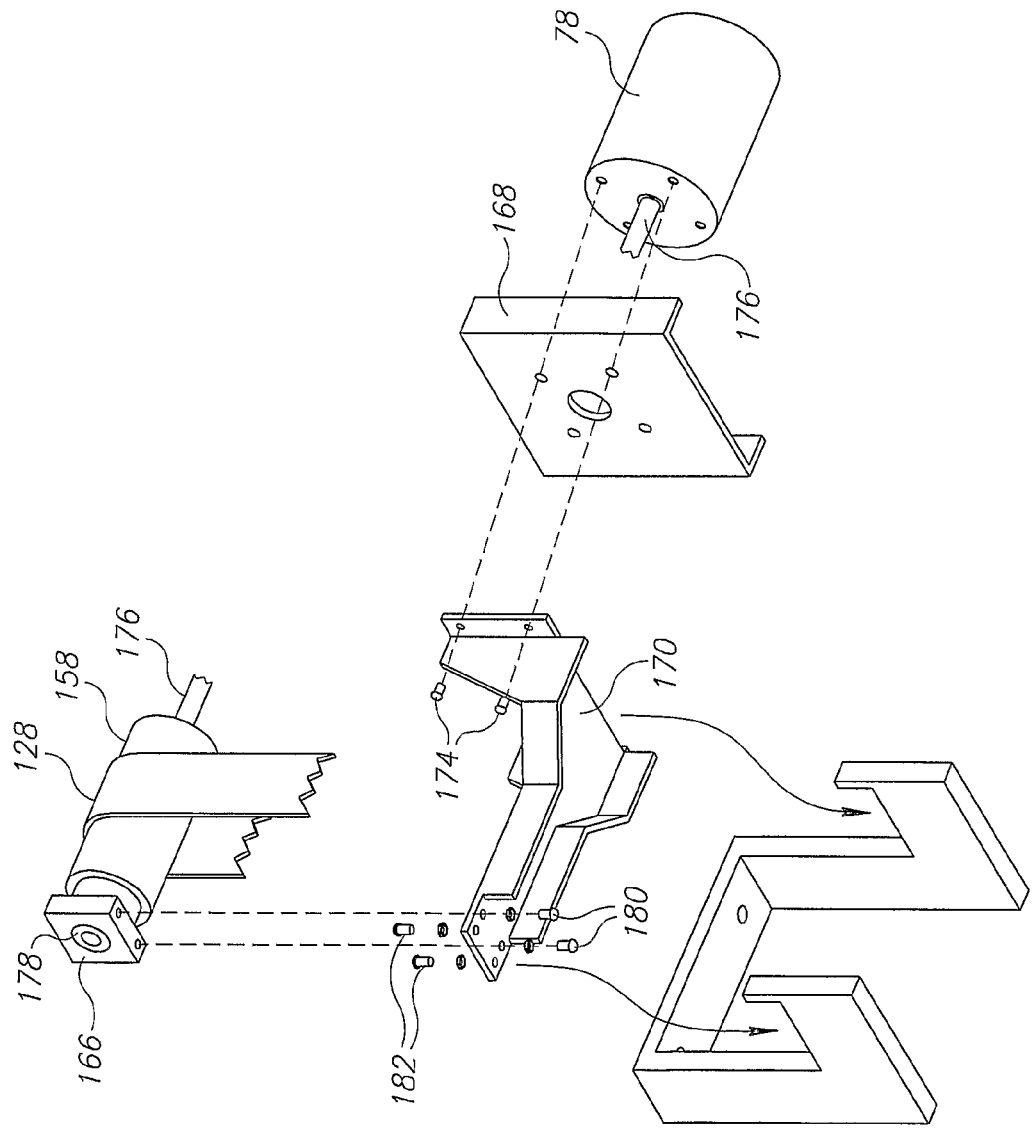
FIG. 11 shows the mounting of a motor in a motor housing of a timing belt drive unit, in accordance with embodiments of the present invention.

FIG. 11 shows the mounting of a motor to a timing belt drive unit, in accordance with embodiments of the present invention. Motor 78 is attached to motor plate 168 and motor mount 170 using screws 174. Drive pulley 158 is attached to motor shaft 176. At the end of motor shaft 176 is bearing 178 and square plate 166. Square plate 166 is fixed to motor mount by means of screws 180. Adjustment screws 182 are secured to motor mount 170, and are used to adjust the alignment of timing belt 128.

Figure 12A:
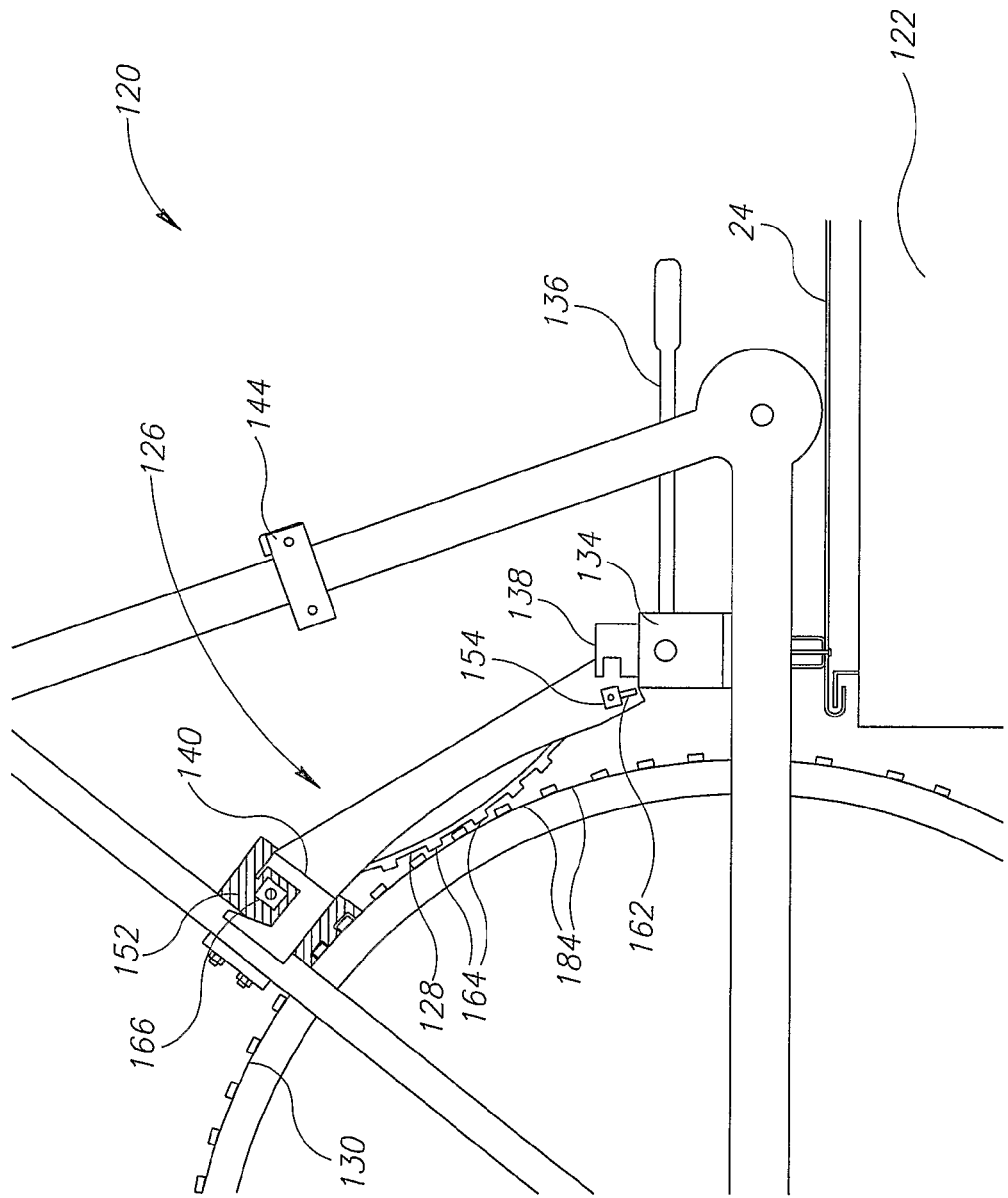
FIG. 12A illustrates mounting a timing belt drive unit on an adapted bicycle, in accordance with embodiments of the present invention.

FIG. 12A illustrates mounting a timing belt drive unit on an adapted bicycle, in accordance with embodiments of the present invention. Drive unit 126 is mounted on adapted bicycle 120 such that square plate 166 rests on drive unit upper bracket 140. Tightening handle 136 is rotated such that square plates 154 fit into, and are held by, holder 138. Tightening handle 136 is rotated upward to tightening handle stop 144. Rotating tightening handle 136 holds drive unit 126 firmly in place, and forces timing belt 128 taut against the outside of tire 130. In this manner, tension stress on belt 128 is applied directly to motor shaft 176 and axle 153. Applying the tension stress directly to motor shaft 176 and axle 153 enables a structurally lightweight drive unit 126, motor housing 152, and belt housing 156.

Figure 12B:
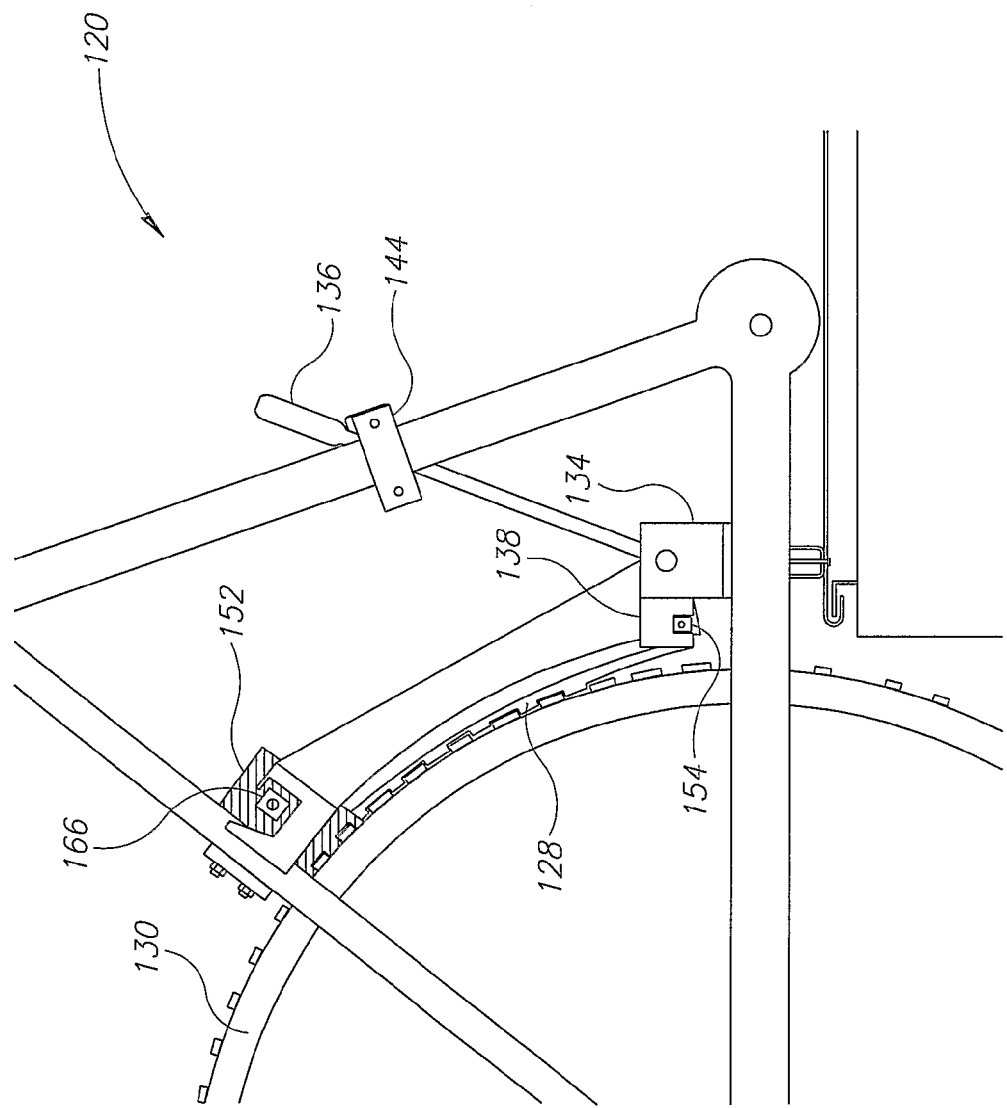
FIG. 12B illustrates the timing belt drive unit of FIG. 12A as mounted on the adapted bicycle.

FIG. 12B illustrates the timing belt drive unit of FIG. 12A as mounted on the adapted bicycle. When the motor of the drive unit is turned on, timing belt 128 is driven, forcing tire 130 to turn and to propel adapted bicycle 120. Battery unit 122 may be mounted on battery unit bracket 24 either before or after drive unit 126 is mounted.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A portable removable apparatus for powering a bicycle driven by a bicycle chain, the apparatus comprising:
   a portable and removable drive unit for propelling the bicycle, the drive unit including an electric motor and an output shaft rotatable by the electric motor with a sprocket coaxially affixed to the shaft and adapted to engage to an inner side of a portion of the bicycle chain;
   a bracket adapted to be fixed to a frame of the bicycle and to be in bearing contact with the output shaft for supporting the output shaft; and
   at least one additional support for supporting the drive unit on the bicycle frame so as to substantially eliminate lateral torque on the drive unit when the drive unit is engaged with the chain and is operating such that the output shaft is pulled against the bracket and the drive unit is pulled against said at least one additional support.

2. The apparatus of claim 1, wherein said bracket and said at least one additional support are configured so as to facilitate attaching the drive unit to the bicycle by facilitating engaging the sprocket with the chain and displacing a portion of the chain by displacing a derailleur cage of the bicycle.

3. The apparatus of claim 1, wherein said at least one additional support is a part of a second bracket.

4. The apparatus of claim 1, wherein said at least one additional support is a part of the bracket.

5. The apparatus of claim 1, comprising a power source of variable electric power to power the electric motor.

6. The apparatus of claim 5, wherein the power source is portable and removable.

7. The apparatus of claim 6, wherein the power source when removed is attachable to the drive unit when removed to form a single portable unit.

8. The apparatus of claim 5, wherein the power source is rechargeable.

9. The apparatus of claim 1, wherein the output shaft is rotatable by the electric motor via a reduction gear.

10. An apparatus as claimed in claim 9, wherein the reduction gear comprises a component selected from a group consisting of: a planetary gear, a pinion gear, and an overrunning clutch.

11. An apparatus as claimed in claim 1, wherein the bearing contact comprises a bearing mounted on the output shaft.

12. An apparatus as claimed in claim 1, wherein the point of said bearing contact with the output shaft, a tensioned segment of the bicycle chain, and said at least one additional support are substantially coplanar.

13. An apparatus as claimed in claim 1, wherein a throttle control for controlling the electric motor comprises an adapted gear shift lever.

* * * * *